United States Patent
Polk et al.

(10) Patent No.: US 12,347,257 B2
(45) Date of Patent: Jul. 1, 2025

(54) HUMAN LOOK-ALIKE ELECTRONIC FILING CABINET AND A SYSTEM THEREOF

(71) Applicants: Cassandra Polk, Mesquite, TX (US); Meghan Polk, Balch Springs, TX (US)

(72) Inventors: Cassandra Polk, Mesquite, TX (US); Meghan Polk, Balch Springs, TX (US)

(*) Notice: Subject to any disclaimer, the term of this patent is extended or adjusted under 35 U.S.C. 154(b) by 544 days.

(21) Appl. No.: 17/863,990

(22) Filed: Jul. 13, 2022

(65) Prior Publication Data

US 2023/0367856 A1 Nov. 16, 2023

Related U.S. Application Data

(60) Provisional application No. 63/340,724, filed on May 11, 2022.

(51) Int. Cl.
| | |
|---|---|
| *G07C 9/37* | (2020.01) |
| *G10L 15/00* | (2013.01) |
| *G10L 15/22* | (2006.01) |
| *H04N 1/00* | (2006.01) |
| *H04N 1/44* | (2006.01) |

(52) U.S. Cl.
CPC .............. *G07C 9/37* (2020.01); *G10L 15/005* (2013.01); *G10L 15/22* (2013.01); *H04N 1/00519* (2013.01); *H04N 1/00854* (2013.01); *H04N 1/00875* (2013.01); *H04N 1/442* (2013.01); *H04N 1/444* (2013.01); *H04N 1/4473* (2013.01); *G10L 2015/223* (2013.01)

(58) Field of Classification Search
CPC ......... G07C 9/37; G10L 15/005; G10L 15/22; G10L 2015/223
USPC .................................................. 382/1.1–1.14
See application file for complete search history.

(56) References Cited

U.S. PATENT DOCUMENTS

| | | | | |
|---|---|---|---|---|
| 11,284,238 | B1* | 3/2022 | Wen ......................... | H04L 67/12 |
| 11,982,993 | B2* | 5/2024 | Cella ........................ | B25J 13/00 |
| 2010/0209018 | A1* | 8/2010 | Adkins .................... | G06F 16/93 |
| | | | | 382/306 |
| 2020/0218767 | A1* | 7/2020 | Ritchey .................... | G06F 16/90 |
| 2023/0308605 | A1* | 9/2023 | Ritchey ............... | H04N 21/4305 |

* cited by examiner

*Primary Examiner* — Gabriel I Garcia
(74) *Attorney, Agent, or Firm* — Brennan, Manna & Diamond, LLC

(57) ABSTRACT

The present invention relates to a human look-alike electronic file cabinet. The electronic file cabinet is configured to provide a secure filing system in offices and to replace paper-filing cabinets. The cabinet includes cameras as the eyes and nose, microphone as mouth, two filing slots for dispensing files and receiving files, a fingerprint analysis screen for authorizing users for interacting with the cabinet, speakers, paper shredder, and trash receptacle. The microphone captures user voice requests and accordingly a processor operates the cabinet for dispensing a requested file or digitally storing a re-filed file. The cabinet can be a part of electronic filing system connecting a plurality of cabinets to a central cloud server. The cabinet can understand different languages and can contact emergency services when required.

20 Claims, 6 Drawing Sheets

HUMAN LOOK-ALIKE ELECTRONIC FILING CABINET AND A SYSTEM THEREOF

CROSS-REFERENCE TO RELATED APPLICATION

The present application claims priority to, and the benefit of, U.S. Provisional Application No. 63/340,724, which was filed on May 11, 2022, and is incorporated herein by reference in its entirety.

FIELD OF THE INVENTION

The present invention relates generally to the field of electronic filing cabinets and secure filing systems. More specifically, the present invention relates to a novel office professional look-alike electronic filing cabinet. The electronic filing cabinet authorizes users and enables authorized users to request a file by audibly speaking the name of the client file and re-filing files by submitting physical files. The cabinet obviate the delay in locating files and mismanagement of files in tax offices, hospitals, and more. Accordingly, the present disclosure makes specific reference thereto. Nonetheless, it is to be appreciated that aspects of the present invention are also equally applicable to other like applications, devices, and methods of manufacture.

BACKGROUND

By way of background, small offices, tax offices, hospitals, and many more use paper-filing cabinets to store documents, such as customer files, folders, and other documents. Such documents and files are stored in physical form that not only takes physical space for storage but are difficult to handle. Physical documents are prone to damage and tearing, and further security is not assured in paper-filing cabinets. No effective access control mechanism can be applied to such cabinets. Files, especially customer files, contain confidential information including, but not limited to, personal details and financial details. The information can be easily accessed in paper-filing cabinets and can become compromised.

Further, files in paper-filing cabinets can be easily lost and misplaced. Important information both for the offices and the customers are periodically lost and are required to be re-filed by a user. This is not only time consuming and laborious, but also expensive. Further, an office professional is always required to be physically present to provide the necessary files to a user. In paper-filing cabinets, time is wasted for manually looking for files and often files are accidentally misfiled.

It is a common problem for users to fully comprehend information or make another office professional understand responses because of language issues. Especially, when a user visits a branch of an office in a different state or country, language and accent problems are faced by individuals and therefore, individuals desire a system that helps them in locating their files easily without any associated language issues.

Therefore, there exists a long felt need in the art for an improved filing cabinet system that can replace manual paper-filing cabinets. There is also a long felt need in the art for an electronic filing cabinet system that provides a secure filing system for all types of offices. Additionally, there is a long felt need in the art for electronic filing cabinets that obviate the need of an office professional to be physically present for retrieving and storing files. Moreover, there is a long felt need in the art for electronic filing cabinets that reduce time for locating requested files. Further, there is a long felt need in the art for electronic filing cabinets that obviate manual searching for stored files and misfiling of files. Furthermore, there is a long felt need in the art for electronic filing cabinets that securely stores customer files and records and maintains their confidentiality. Also, there is a long felt need in the art for electronic filing cabinets that understand different languages and accents and can automatically retrieve and dispense files for users. Finally, there is a long felt need in the art for electronic filing cabinets that enables only authorized users to access requested information on a need basis and maintains logs of access of files.

The subject matter disclosed and claimed herein, in one embodiment thereof, comprises a human look-alike electronic filing cabinet. The electronic filing cabinet is designed in the likeness of an office professional for dispensing or distributing requested files and take back returned file folders for filing. The cabinet further comprising a face having a pair of eyes, a pair of ears, a nose, a mouth, and hair; the pair of eyes and the nose having integrated high-definition cameras for recording videos; the pair of ears have integrated speakers for playing out instructions; the mouth having an integrated directional microphone for capturing sound of a user standing in front of the cabinet; the front surface having a fingerprint scanner for scanning a fingerprint image of the user for authorizing a user; a pair of slots for dispensing physical files and receiving physical files from the user interacting with the cabinet wherein the cabinet dispenses or retrieves files upon receiving a user voice request captured by the microphone. The microphone understands different languages and can process the request accordingly.

In this manner, the electronic filing cabinet of the present invention accomplishes all of the forgoing objectives and provides users with an electronic filing cabinet designed in the likeness of an office professional. The cabinet automatically dispenses requested files and receives re-filed files from authorized users. The cabinet can understand different languages and can store files in digital format. The cabinet maintains security and uses fingerprint recognition for authorization of users. The cabinet is useful for eliminating paper-filing cabinets.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a human look-alike electronic filing cabinet. The electronic filing cabinet includes a one-piece structure and further comprising a housing having a front surface in the shape of an office professional, a face having a pair of eyes, a pair of ears, a nose, a mouth, and hair; the pair of eyes and the nose having integrated high-definition cameras for recording videos; the pair of ears have integrated speakers for playing out instructions; the mouth having an integrated directional microphone for capturing sound of a user standing in front of the cabinet; the front surface having a fingerprint scanner for scanning a fingerprint image of the user for authorizing a user; a pair of slots including a first slot and a second slot; the first slot is configured to dispense physical files therefrom wherein the dispensed files are printed form of digital files stored in internal memory of the cabinet; the second slot is configured to receive physical files from the user interacting with the cabinet, wherein the received files are scanned and digitized by the cabinet for storing in internal memory, the cabinet dispenses or retrieves files upon receiving a user voice request captured by the microphone.

In yet another embodiment, the cabinet processes the voice request received in one or more languages from English, German, Spanish, Chinese, French, and more.

In yet another embodiment, the cabinet includes a hand that is configured to move during processing of the files by the cabinet.

In yet another embodiment, the cabinet includes a shredder slot at the rear surface and a trash repository disposed at the bottom thereof.

In yet another embodiment, the authorization of user is completed using a passcode.

In yet another embodiment, the cabinet uses file name or username as the identifier for a file for retrieving same from the memory.

In yet another embodiment, an electronic filing cabinet designed to distribute requested files and take back returned file folders for filing is disclosed. The electronic filing cabinet is fixed to a floor and resembles an office professional. The cabinet further comprising a pair of slots including a first slot and a second slot; the first slot is configured to dispense the requested files wherein the files are retrieved in digital form a memory module, printed by a printer module and dispensed from the first slot; the second slot is configured to receive re-filed files wherein the re-filed files are scanned to convert into digital form and are stored in the memory module; a fingerprint scanner for scanning fingerprint images of a user wherein the scanned fingerprint images are authorized by a processor for authorizing the user before interacting with the cabinet; a microphone for receiving the requests for dispensing or distributing files and taking back returned files from the user; the cabinet includes a network surface for contacting emergency services such as 911 in case an emergency service is needed and is a part of cloud network.

In yet another embodiment, a secure electronic filing system is disclosed. The system includes a plurality of human look-alike electronic filing cabinets connected to a central server; each filing cabinet includes a slot for file distribution and another slot for receiving files, a fingerprint analysis for receiving and authorizing fingerprints, a microphone for capturing user requests wherein the requested files for file distribution are retrieved from the central server and re-filing of files are stored in the central server thereby enabling a user to store and retrieve files from any cabinet from the plurality of human look-alike electronic filing cabinets.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents.

Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
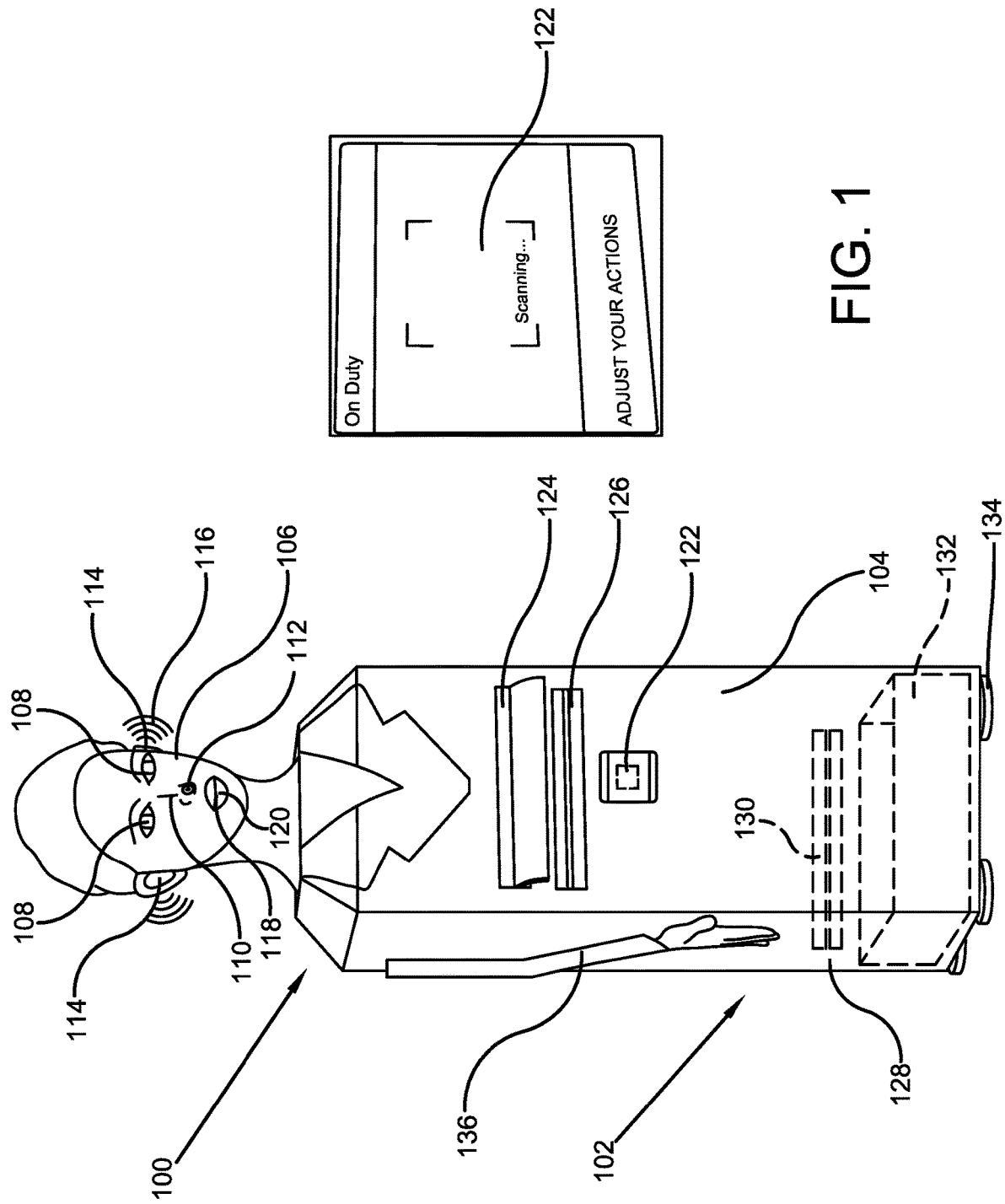
FIG. 1 illustrates a perspective view of one potential embodiment of an electronic filing cabinet of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved filing cabinet system that can replace manual paper-filing cabinets. There is also a long felt need in the art for an electronic filing cabinet system that provides a secure filing system for all types of offices. Additionally, there is a long felt need in the art for electronic filing cabinets that obviate the need of an office professional to be physically present for retrieving and storing files. Moreover, there is a long felt need in the art for electronic filing cabinets that reduce time for locating requested files. Further, there is a long felt need in the art for electronic filing cabinets that obviate manual searching for stored files and misfiling of files. Furthermore, there is a long felt need in the art for electronic filing cabinets that securely stores customer files and records and maintains their confidentiality. Also, there is a long felt need in the art for electronic filing cabinets that understand different languages and accents and can automatically retrieve and dispense files for users. Finally, there is a long felt need in the art for electronic filing cabinets that enables only authorized users to access requested information on a need basis and maintains logs of access of files.

The present invention, in one exemplary embodiment, is a novel electronic filing cabinet designed to distribute requested files and take back returned file folders for filing. The electronic filing cabinet is fixed to a floor and resembles an office professional. The cabinet further comprising a pair of slots including a first slot and a second slot; the first slot is configured to dispense the request files wherein the files are retrieved in digital form a memory module, printed by a printer module, and dispensed from the first slot; the second slot is configured to received re-filed files wherein the re-filed files are scanned to convert into digital form and are stored in the memory module; a fingerprint scanner for scanning fingerprint images of a user wherein the scanned fingerprint images are authorized by a processor for authorizing the user before interacting with the cabinet; a microphone for receiving the requests for dispensing or distributing files and taking back returned files from the user; the cabinet includes a network surface for contacting emergency services such as 911 in case an emergency service is needed and is a part of cloud network.

Referring initially to the drawings, FIG. 1 illustrates a perspective view of one potential embodiment of an electronic filing cabinet of the present invention in accordance with the disclosed architecture. The human look-alike electronic filing cabinet 100 is designed in the likeness of an office professional wearing a professional office attire. The cabinet 100 is configured to function as a virtual office professional for receiving and dispensing or distributing files and documents to authorized users. More specifically, the cabinet 100 includes a housing 102 resembling an office professional from a front side 104 and includes a face 106. The face 106 includes a pair of eyes 108 and a nose 110, wherein the pair of eyes 108 and the nose 110 have high-definition cameras 112 disposed on them. The cameras 112 are used for recording video around the cabinet 100 for recording and surveillance. Further, the cameras 112 can be used for authorizing and detecting a user using the cabinet 100. A pair of ears 114 have integrated speakers 116 for playing out instructions and notifications for users. The mouth 118 includes at least one microphone 120 for capturing voice/instructions of a user using the filing cabinet 100 for storing and retrieving documents. The microphone 120 is preferably a directional microphone that spatially filters received sound so that sounds arriving from the field of view of the cameras 112 are accepted (constructively combined) and sounds arriving from other directions are rejected (destructively combined).

For enabling only authorized users to access the cabinet 100 and for authorizing a user, the human look-alike electronic filing cabinet 100 provides a fingerprint detection screen 122 on the housing. The fingerprint detection screen 122 is configured to scan a fingerprint of a user and upon successful authorization of the fingerprint, access for retrieving and filing documents using the cabinet 100 is provided to the user. The fingerprint detection screen 122 can use any state of art technology such as optical scanners, thermal scanners, capacitive scanners, E-field sensors, ultrasonic scanners, and many more to obtain an image of the finger placed on the screen 122.

A first slot 124 is disposed on the front side 104 for dispensing one or more files by the cabinet 100. The first slot 124 preferably dispenses a physical file for immediate access by a user. The electronic cabinet 100 on capturing a file request from a user, locates the physical or a digital file corresponding to the file request, and dispenses the file in physical format to the user. Additionally, a digital copy can be sent electronically to an email address of the user. A second slot 126 is disposed below the first slot 124 and is used by a user for filing (i.e. receiving) file or document to the electronic cabinet 100. The files received by the electronic cabinet 100 are stored in both physical and digital form for later access and retrieval. The advantage of the electronic filing cabinet is that files are securely stored in both physical and digital form ensuring that files are not misplaced and always remain protected. Further, time for retrieving files for a user takes less time in comparison to locating file manually in conventional cabinets.

The rear surface 128 of the housing 102 includes a paper shredder slot 130 for receiving papers that can be shredded by the cabinet 100. A paper shredder module is disposed inside the housing 102 and is coupled to the paper shredder slot 130. A trash receptacle 132 is positioned at the base of the cabinet 100 for storing the waste and shredded paper. It should be noted that the electronic cabinet 100 has the capability of understanding a plurality of languages including, but not limited to, English, French, German, Chinese, Spanish and more, and provides basic greeting messages in the same language of the user, enabling for a smooth file retrieval process for users.

In the preferred embodiment, the electronic cabinet 100 is secured to a floor using fasteners 134 and is immovable. In alternative embodiments, the electronic cabinet 100 may have wheels enabling a user to move the cabinet 100 as per their preferences. Further, the cabinet 100 can be used in tax offices, hospitals, and more where a lot of files are conventionally stored in physical form and where it requires a lot of time to locate a request file.

In one exemplary embodiment of the present invention, a hand 136 of the human look-alike electronic filing cabinet 100 is raised when an action such as dispensing a file or receiving a file is performed by the cabinet 100.

Figure 2:
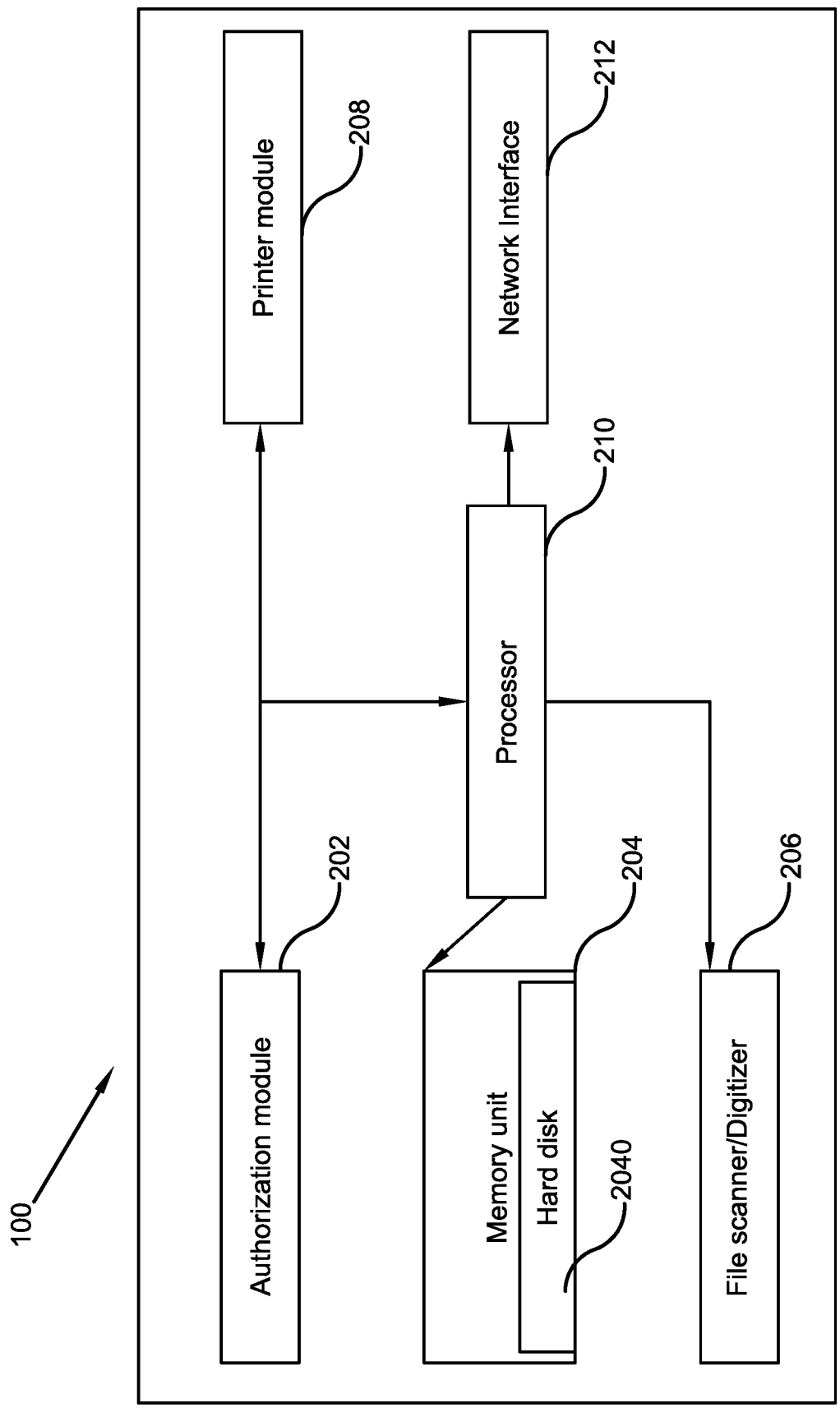
FIG. 2 illustrates a schematic block diagram of the electronic filing cabinet of the present invention showing the internal components and modules in accordance with the disclosed architecture.

FIG. 2 illustrates a schematic block diagram of the electronic filing cabinet 100 of the present invention showing the internal components and modules in accordance with the disclosed architecture. The electronic filing cabinet 100 internally includes an authorization module 202 for checking and authorizing the received fingerprint from the fingerprint detection screen 122 for enabling access of the cabinet 100 for a user. The authorization module 202 is coupled to a memory unit 204 which stores the authorized fingerprints of users. The fingerprints can be stored in the memory unit 204 during registration of a user to the cabinet 100.

A file scanner 206 is used for scanning and digitizing the files received from the second slot 126. The files filed by a user are scanned in real time by the file scanner 206 and the scanned/digital copies of the files are stored in the hard disk 2040 of the memory unit 204 for later access. The physical files submitted by a user are also stored in a physical cabinet (not shown) of the human look-alike electronic filing cabinet 100. The physical cabinets can be external to the electronic filing cabinet and may be coupled to the cabinet 100. A printer module 208 is used for printing a requested file by a user and is coupled to the first slot 124 of the cabinet 100.

A processor 210 is configured to manage the operations of the electronic filing cabinet 100 and execute the dispensing and storage of the files. The processor 210 may include a variety of system on chips (SoC) such as a multi-core processor, a graphic processing unit (GPU), an application processor (AP) and so on. A network interface 212 enables the electronic filing cabinet 100 to wirelessly connect to an emergency and security service such as 911 in case of an emergency. This enables the cabinet 100 to automatically alert the authorities about an emergency. In one embodiment, the cabinet 100 is programmed to call 911 service when the cameras 112 detect a weapon such as a gun. The network interface 212 also enables the cabinet 100 to be wirelessly connected to intranet of the premises or organization in which the cabinet 100 is stored. Without limitation, the cabinet 100 can be a part of NFC, Zigbee, WiMAX, Bluetooth, Ethernet, and IEEE 802.11, among other examples, over one or more types of networks, such as wide area networks (WAN), local area networks (LAN), and personal area networks (PAN), among other possibilities.

It should be noted that the processor 210 operates the cabinet 100 based on the received query or request from a user of the cabinet 100 and accordingly, instructs components of the cabinet 100 to perform the required functionality.

Figure 3:
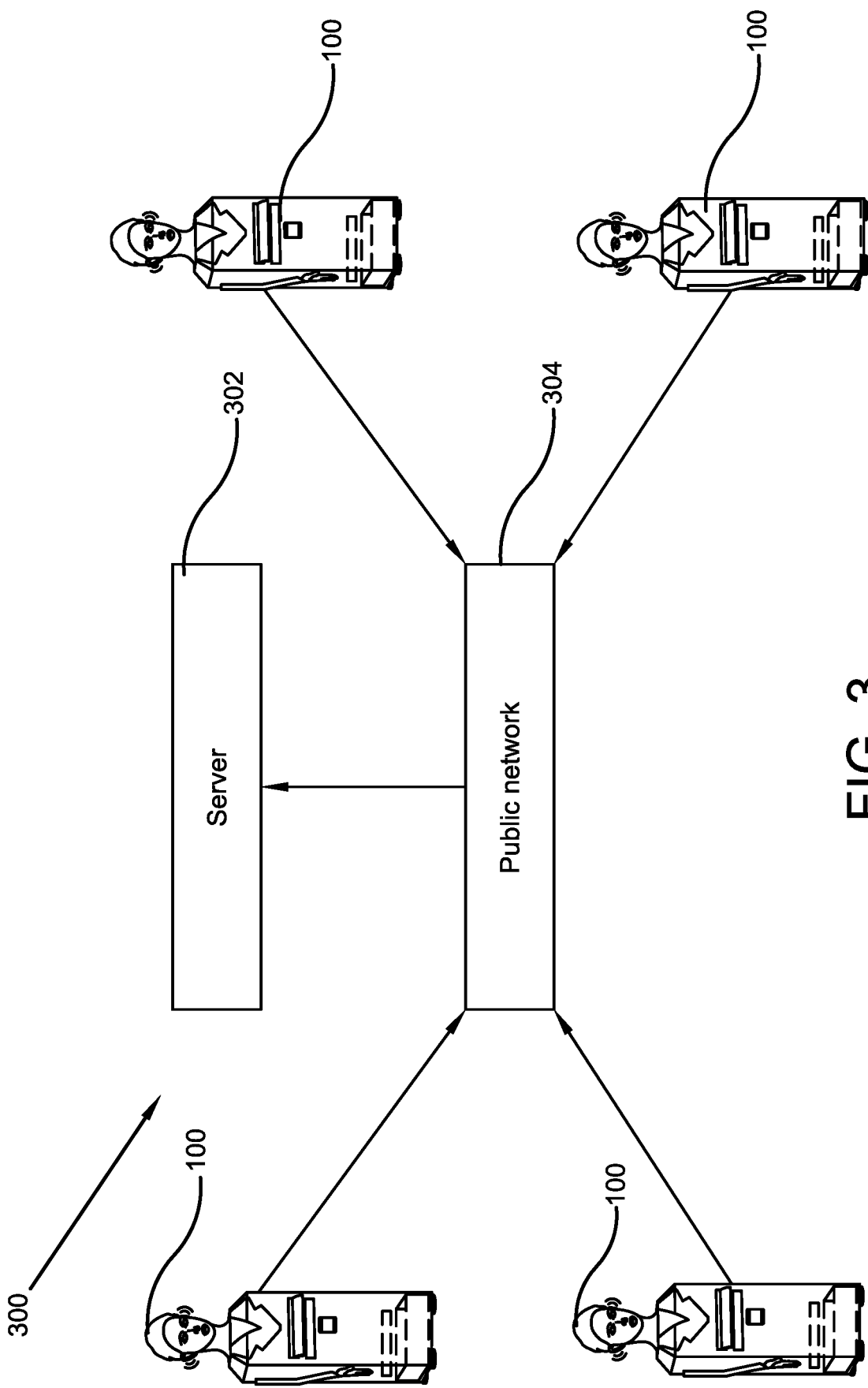
FIG. 3 illustrates a schematic view of one potential embodiment of the electronic filing cabinet system of the present invention used in an organization for automatic and secure filing system in accordance with the disclosed architecture.

FIG. 3 illustrates a schematic view of one potential embodiment of the electronic filing cabinet system of the present invention used in an organization for automatic and secure filing system in accordance with the disclosed architecture. The electronic filing cabinet 100 of the present invention can be used to make a complete and secure system 300 for big organizations that span across multiple floors, buildings, areas or even countries. More specifically, a plurality of cabinets 100 are connected to a central server which can be a cloud server 302. The connection can be using a public or private network 304 and can be wired or wireless.

Each cabinet 100 works in a manner as described earlier in the disclosure and in the present embodiment, syncs the files with server 302 enabling a central, and secured repository of files of the users. The physical copies of the files submitted by users may be stored locally by each cabinet but the digital or electronic copies are stored locally as well as in central cloud server 302. This enables an authorized user to submit and retrieve files from any location and thus makes the system 300 centralized.

In the present embodiment, the video recorded by cameras of the cabinets and the transaction records of the files submitted and retrieved using the cabinets are also stored in the cloud server 302. Each cabinet 100 can act as an independent electronic filing cabinet and can also function as a part of the electronic filing cabinet system 300.

Figure 4:
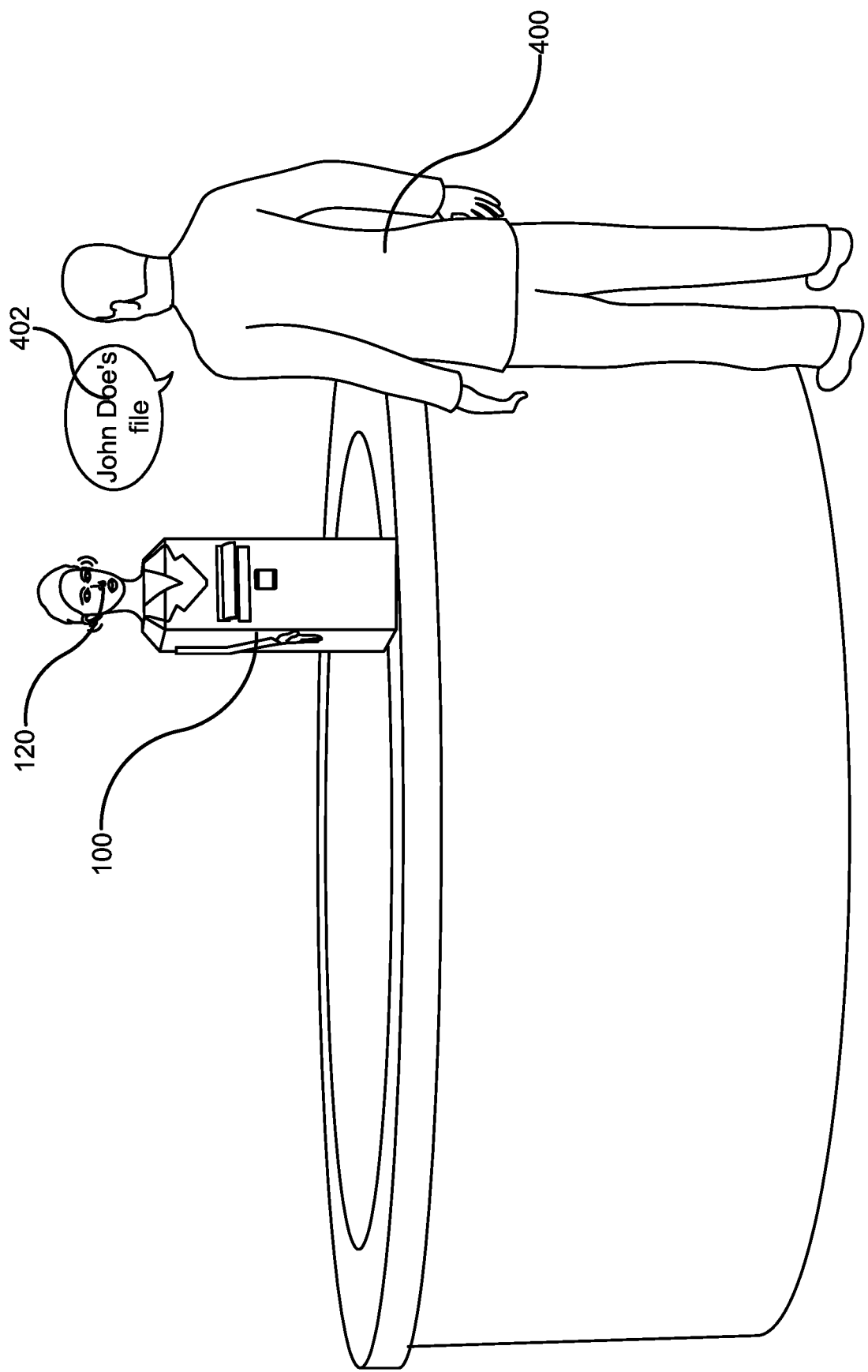
FIG. 4 illustrates a perspective view showing the electronic file cabinet positioned in an office dispensing a requested file in accordance with the disclosed architecture.

FIG. 4 illustrates a perspective view showing the electronic file cabinet 100 positioned in an office dispensing a requested file in accordance with the disclosed architecture. As described earlier, an authorized requesting user 400 can interact with the cabinet 100 using voice command which is captured by directional microphone of the cabinet 100 for processing. In the present embodiment, the user 400 after authorizing using the fingerprint scanner 122 can interact with the cabinet 100 and submits a fill access request 402 including an identifier of the requested file. The identifier can be a name of the user or any other identifier of the file. The microphone 120 captures the file request 402 and processes the request to retrieve the requested file. Then, using the first slot 124, the cabinet 100 dispenses the requested file for immediate access by the user 400.

It should be appreciated that the cabinet 100 is programmed and configured to provide the files for which the user 400 is authorized. Upon successful fingerprint authorization of the user, the processor 210 is configured to provide access only to the files which are accessible to the user 400 on a permission basis.

Figure 5:
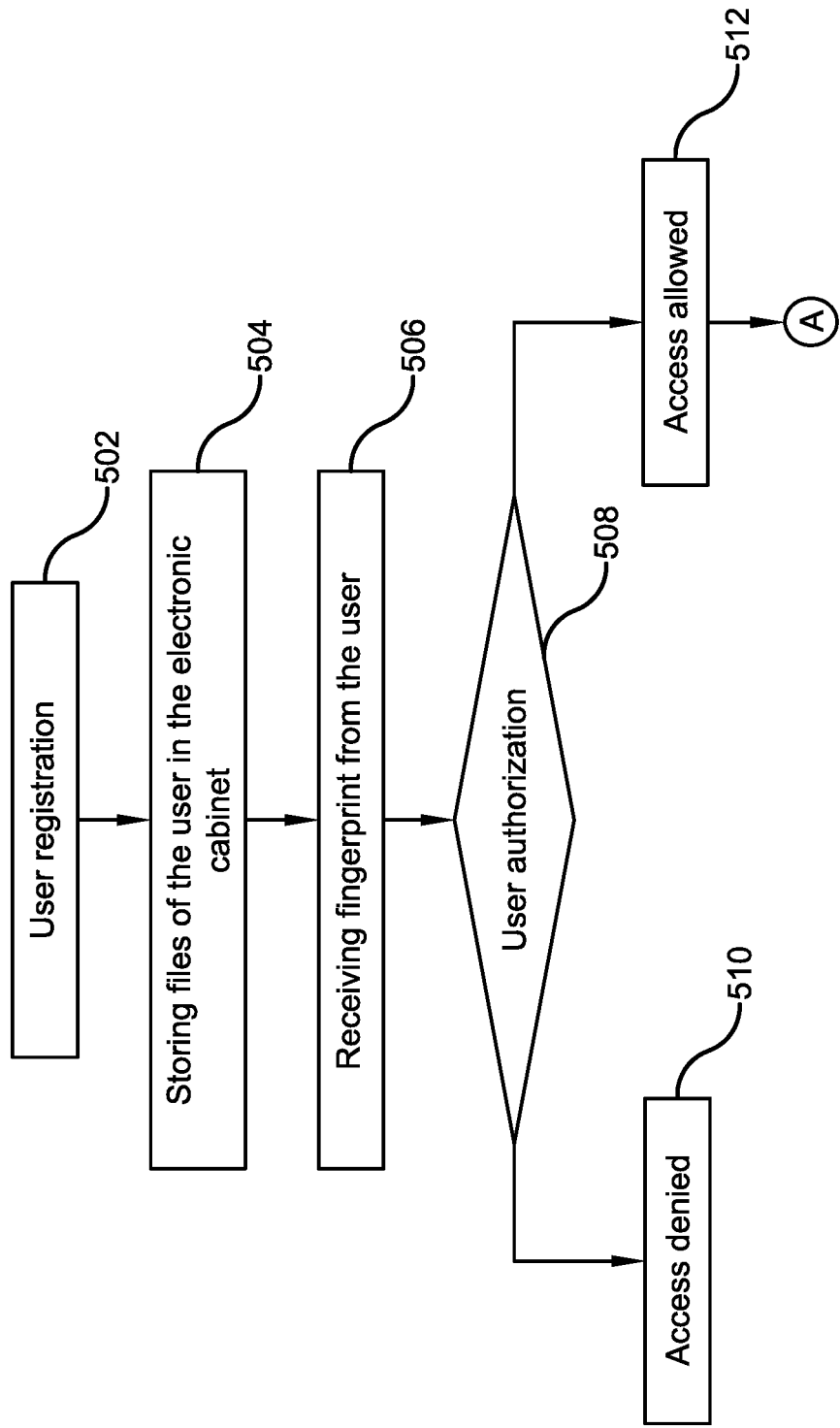
FIG. 5 illustrates a flow chart depicting process of authorization of a user for interacting with the human look-alike electronic filing cabinet of the present invention in accordance with the disclosed architecture.

FIG. 5 illustrates a flow chart depicting a process of authorization of a user for interacting with the human look-alike electronic filing cabinet of the present invention in accordance with the disclosed architecture. Initially, a user is registered in the electronic filing cabinet (Step 502). It should be noted that user can be registered on any cabinet of cloud system in which a plurality of cabinets is connected to the cloud. In a standalone cabinet, a user is required to physically register at the cabinet (Step 504). Then, the existing files of the registered user are stored in the cabinet. If no existing files are present, then, a user may be asked to file the files in the cabinet.

Then, for using the electronic filing cabinet, a fingerprint image is received by the cabinet from the fingerprint sensor (Step 506). Upon receiving the fingerprint image, a user authorization is performed by a processor of the cabinet (Step 508). In situations where the user is not authorized, then, the access to the cabinet is denied and optionally, a message may be played out or displayed (Step 510). When the fingerprints are authorized, then, the process moves to step 512 and access to the cabinet is enabled (Step 512). When access to the cabinet is enabled, the microphone of the cabinet is activated.

Figure 6:
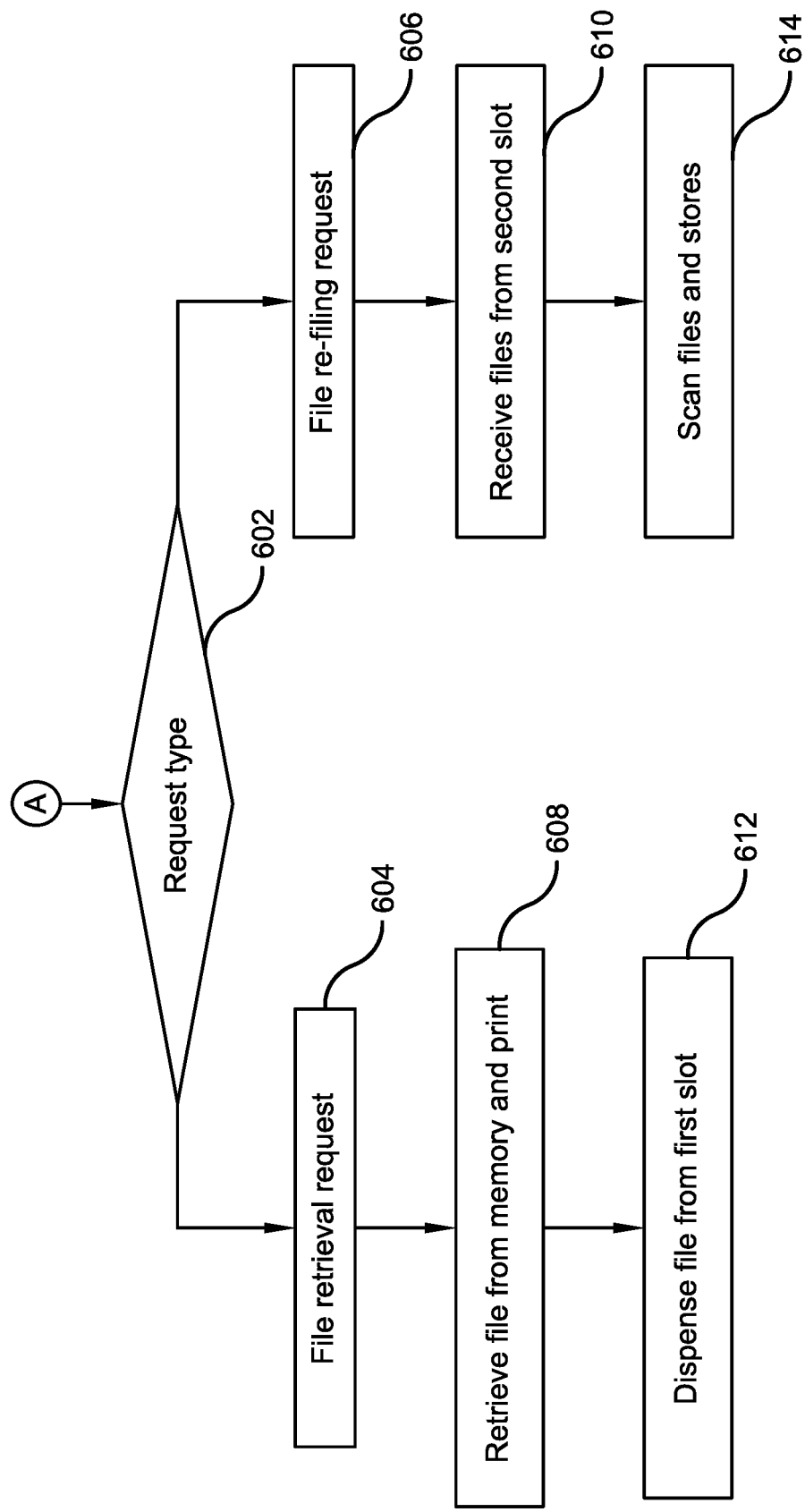
FIG. 6 illustrates a flow chart depicting process of working of the human look-alike electronic filing cabinet of the present invention post authorization of a user in accordance with the disclosed architecture.

FIG. 6 illustrates a flow chart depicting process of working of the human look-alike electronic filing cabinet of the present invention post authorization of a user in accordance with the disclosed architecture. Once, a user is authorized and a request is received, then the request type is determined by the cabinet (Step 602). In situations where the request is determined to be a file retrieval request (Step 604), then the required file is retrieved from the memory of the cabinet or from the cloud server and is printed by the print module (Step 608). Thereafter, the printed file is dispensed from the first slot for immediate access by the user (Step 612).

In situations where the request is determined to be a file re-filing request (Step 606), then, the files from the second slot are received by the cabinet (Step 610) and the received files are scanned by the cabinet and are stored in internal memory or cloud memory (Step 612).

It should be appreciated that the human look-alike electronic filing cabinet and associated system allow users to easily retrieve their files without delay or any mismanagement. Further, for organizations like tax offices, hospitals and more, the cabinet saves cost, space and ensures more security. Further, the cabinet are HIPAA compliant and can store the information in encrypted format. Also, only authorized users are enabled to interact with the cabinet and confidentiality of the files are maintained and are provided only to authorized users.

Other shapes, designs, and configurations of the human look-alike electronic filing cabinet 100 are contemplated and fall within the scope of the invention without affecting the utility of the device.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "human look-alike electronic filing cabinet", "electronic filing cabinet", "filing cabinet", and "cabinet" are interchangeable and refer to the human look-alike electronic filing cabinet 100 of the present invention.

Notwithstanding the forgoing, the human look-alike electronic filing cabinet 100 of the present invention can be of any suitable size and configuration as is known in the art without affecting the overall concept of the invention, provided that it accomplishes the above stated objectives. One of ordinary skill in the art will appreciate that the human look-alike electronic filing cabinet 100 as shown in the FIGS. are for illustrative purposes only, and that many other sizes and shapes of the human look-alike electronic filing cabinet 100 are well within the scope of the present disclosure. Although the dimensions of the human look-alike electronic filing cabinet 100 important design parameters for user convenience, the human look-alike electronic filing cabinet 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A filing cabinet for receiving files from and dispensing files to authorized users, the filing cabinet comprising:
   a housing having a face, a first dispensing slot, and a second receiving slot;
   wherein said face having a pair of eyes, a pair of ears, and a mouth;
   wherein said pair of eyes having cameras therein comprising a field of view for recording video proximal to said filing cabinet;
   wherein said pair of ears having integrated speakers therein for playing out audible instructions and notifications for a user of said filing cabinet; and
   further wherein said mouth having at least one microphone for capturing audible instructions of the user of said cabinet.

2. The filing cabinet of claim 1, wherein said cameras detect and authorize a user of said filing cabinet.

3. The filing cabinet of claim 1, wherein said housing resembles an office professional from a front side.

4. The filing cabinet of claim 1 further comprising a fingerprint detection screen on said housing for scanning a fingerprint of the user and authorizing access to said filing cabinet.

5. The filing cabinet of claim 4, wherein said fingerprint detection screen is selected from a group consisting of an optical scanner, a thermal scanner, a capacitive scanner, an E-field sensor, and an ultrasonic scanner.

6. The filing cabinet of claim 1, wherein said microphone is a directional microphone that spatially filters received sound so that sounds arriving from said field of view of said cameras are accepted and sounds arriving from other directions are rejected.

7. The filing cabinet of claim 6, wherein said first dispensing slot disposed on a front side of said housing for dispensing a file.

8. The filing cabinet of claim 6, wherein said received sound comprises a file request from the user.

9. The filing cabinet of claim 8, wherein said filing cabinet locates a digital file corresponding to said file request and dispenses said digital file to the user.

10. The filing cabinet of claim 9, wherein the dispensing of said digital file to the user comprises sending electronically said digital file to an email address of the user.

11. The filing cabinet of claim 8, wherein said filing cabinet locates a physical file corresponding to said file request and dispenses said physical file to the user.

12. The filing cabinet of claim 1, wherein said second receiving slot disposed on said front side of said housing for receiving a file.

13. The filing cabinet of claim 12, wherein said file is a digital file.

14. The filing cabinet of claim 12, wherein said file is a physical file.

15. A filing cabinet for receiving files from and dispensing files to authorized users, the filing cabinet comprising:
   a housing having a face, a first dispensing slot, a second receiving slot, and a paper shredder;
   wherein said face having a pair of eyes, a pair of ears, and a mouth;
   wherein said pair of eyes having cameras therein comprising a field of view for recording video proximal to said filing cabinet;
   wherein said pair of ears having integrated speakers therein for playing out audible instructions and notifications for a user of said filing cabinet;
   wherein said mouth having at least one microphone for capturing audible instructions of the user of said cabinet; and
   further wherein said paper shredder having a paper shredder slot for receiving papers for shredding including a trash receptacle thereunder.

16. The filing cabinet of claim 15, wherein said housing having wheels mounted to a bottom surface of said housing for mobility of said housing.

17. The filing cabinet of claim 15, wherein said housing mounted to a floor for preventing movement of said housing.

18. A filing cabinet for receiving files from and dispensing files to authorized users; the filing cabinet comprising:
   a housing having a face, a first dispensing slot, and a second receiving slot;
   wherein said face having a pair of eyes, a pair of ears, and a mouth;
   wherein said pair of eyes having cameras therein comprising a field of view for recording video proximal to said filing cabinet;

wherein said pair of ears having integrated speakers therein for playing out audible instructions and notifications for a user of said filing cabinet;

wherein said mouth having at least one microphone for capturing audible instructions of the user of said cabinet;

a fingerprint detection screen on said housing for scanning a fingerprint of the user and authorizing access to said filing cabinet; and a processor having a multi core processor, a graphic processing unit (GPU), and an application processor (AP) for executing the receiving files and for executing the dispensing files.

19. The filing cabinet of claim 18 further comprising a paper shredder, wherein said paper shredder having a paper shredder slot for receiving papers for shredding.

20. The filing cabinet of claim 18 further comprising a printer module, wherein said printer module prints said dispensing files.

* * * * *